Patented Feb. 1, 1949

2,460,757

UNITED STATES PATENT OFFICE 2,460,757

LIQUID CIRCULATING APPARATUS

William Kurz, Chicago, Ill., assignor to Precision Scientific Co., Chicago, Ill., a corporation of Illinois Application August 24, 1945, Serial No. 612,471

1 Claim. (Cl. 259—96)

This invention relates to constant temperature liquid circulating apparatus.

Apparatus of the character here involved is useful for controlling and maintaining constant temperatures in refractometers, polarimeters, viscosimeters, incubators, calorimeters, etc., where close temperature control is essential. In refractometers, for example, variation of one degree C. in temperature will result in a change of plus or minus .0005 in the refractive index of a liquid. The successful use of such apparatus therefore requires the maintenance of a constant temperature.

One of the objects of the invention is to provide a simple and inexpensive apparatus by which temperature controlling liquid is efficiently circulated during temperature conditioning so that its temperature throughout will be constant.

Another object of the invention is to provide mixing and circulating means of such efficiency that a relatively small volume of heat exchanging liquid (permitting the use of a small sized apparatus) may be maintained at a degree of temperature constancy which has heretofore characterized only apparatus of very large size and capacity.

A further object of the invention is to provide a pump accessory which will serve both as a supply pump booster and as an aid in circulating and mixing the liquid with reference to the temperature regulating devices.

Other objects and advantages of the invention will become apparent from the following description of one apparatus embodying the invention and illustrated in the accompanying drawing.

Figure 1:
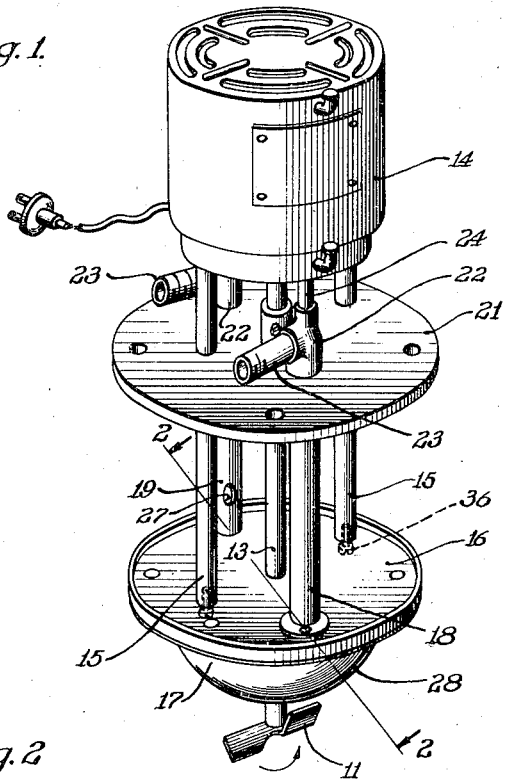
Figure 2:
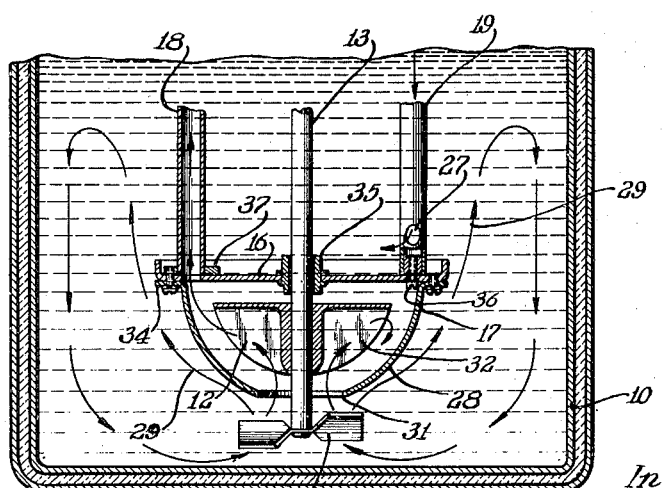

In said drawing:

Fig. 1 is a perspective view of the mixing and circulating devices removed from the surrounding apparatus; and Fig. 2 is a fragmentary sectional elevation on a larger scale and taken on plane 2—2 of Fig. 1, of the lower portions of the circulating and mixing devices and the enclosing liquid reservoir.

In the illustrative apparatus the heat exchanging liquid (e. g. water) is contained in a tempering vessel 10 which is advantageously jacketed and provided with temperature regulating means (not shown) for supplying heat to or removing it from (i. e. cooling) the liquid. Such means include devices for supplying and removing heat and an adjustable regulating thermostat, details of both of which form no part of the invention. Any appropriate temperature regulating devices may be used.

The overall efficiency of the apparatus depends not alone on the efficiency of the thermostatic regulator but also on the uniformity with which the temperature of all portions of the liquid is maintained. This in turn depends on the uniformity and efficiency with which all portions of the liquid are exposed to the temperature regulating means. Convection currents cannot be depended upon, particularly in small apparatus, to maintain constant liquid temperature. The liquid is therefore mechanically circulated and mixed or agitated to insure uniform commingling of the return liquid with the storage liquid and uniform exposure to the temperature regulating surfaces.

The illustrative mixing and circulating devices 11 and 12 are here shown mounted on a common vertical shaft 13 which may advantageously be directly coupled to the shaft of driving motor 14. The latter is mounted on posts 15 projecting upwardly from the top 16 of pump housing 17. Two of such posts, 18 and 19, may advantageously serve as pump delivery and return pipes. Posts 15 extend above and below cover 21 which rests on and covers vessel 10, thereby serving as the supporting base for both motor and pump housing. Pipes 18 and 19 are provided with the fittings 22 by which terminal nipples 23 may be connected to the pipes. The upper T openings are plugged by post elements 24 which extend to and aid in supporting the motor. Hose or other flexible lines may be slipped over nipples 23 to connect the circulating pump with the device to be supplied with heat exchanging liquid. Return pipe 19 discharges through an appropriate orifice 27 at a point above the pump housing and remote from the pump inlet so as to allow maximum opportunity for mixing of return liquid with and tempering by that in the reservoir. Such mixing as may occur, however, is not solely relied upon to effect uniform mixing of the liquid. This is effected by the mechanical agitator 11 in the form of a double bladed impeller connected with the lower end of shaft 13 and rotating in such direction as to drive the liquid upwardly. The upwardly driven liquid encounters a curved deflecting surface 28 on the exterior of the pump housing 17 thus setting up elongated circulating paths represented by arrows 29 which effect not only a thorough mixing of the liquid to secure uniform temperature throughout but to carry the liquid uniformly into contact with the walls of vessel 10 or other surfaces through which heat is exchanged to regulate the liquid temperature, either by heating or cooling to the proper level.

A fraction of the liquid driven upwardly by the mixing impeller 11 enters the pump casing through axial opening 31 therein around shaft 13, and enters centrifugal impeller 32, also on shaft 13, by which the liquid is circulated as aforesaid. The liquid discharged from impeller 32 travels upwardly through pipe 18 and returns through pipe 19 as above described. The mixing device 11 therefore serves additionally as a booster for the centrifugal impeller 32 and particularly avoids any short circuiting (and faulty tempering) of the liquid such as might occur if supply to impeller 32 depended upon the suction created thereby. Such suction would tend to draw liquid through the paths of least resistance and might therefore withdraw inadequately tempered or non-uniformly mixed liquid. The agitator 11 delivers only thoroughly mixed liquid and only a fraction of that circulated by the mixing device (the balance being repeatedly circulated), thereby insuring delivery to the centrifugal pump of uniformly tempered liquid.

Pump casing 17 is here shown connected to the pump cover 16 by screws passing through flanges 34 in the housing. Pump cover 16 carries the bearing 35 for shaft 13. The supporting posts 15 are connected to pump cover 16 by screws 36 threaded into the ends of the posts or in case of the pipe 18 which serves as a discharge conduit for the pump, by a base flange 37.

Obviously the invention is not limited to the details of the illustrative apparatus since these may be variously modified. Moreover it is not indispensable that all features of the invention be used conjointly since various features may be used to advantage in different combinations and sub-combinations.

I claim as my invention:

A constant temperature liquid circulating apparatus comprising in combination a storage vessel, a cover therefor carrying a driving motor having a shaft extending through said cover into said vessel and carrying at its lower end adjacent the bottom of said vessel a mixing agitator adapted to create circulating currents of liquid, a pump casing in said vessel, a plurality of posts from said cover and supporting said pump casing, said posts extending upwardly above said casing to support said motor, a pair of said posts being hollow and constituting liquid discharge and return conduits for said pump casing, an impeller carried by said shaft inside said casing, said casing having an opening therein for withdrawing a portion of the circulated liquid from said vessel, said return conduit having a discharge opening at a point remote from said agitator.

WILLIAM KURZ.

REFERENCES CITED

The following references are of record in the file of this patent:

UNITED STATES PATENTS

| Number | Name | Date |
|---|---|---|
| 1,167,357 | Haas et al. | Jan. 4, 1916 |
| 1,738,989 | Head | Dec. 10, 1929 |
| 1,947,851 | Jewett | Feb. 20, 1934 |
| 2,041,207 | Rietz | May 19, 1936 |
| 2,071,393 | Doherty | Feb. 23, 1937 |
| 2,114,547 | Sollinger | Apr. 19, 1938 |